(12) United States Patent
Kapinos et al.

(10) Patent No.: US 11,880,449 B2
(45) Date of Patent: Jan. 23, 2024

(54) TEMPORARY PASSWORD FOR PASSWORD RESET

(71) Applicant: Lenovo (Singapore) Pte. Ltd., Singapore (SG)

(72) Inventors: Robert James Kapinos, Durham, NC (US); Robert James Norton, Jr., Raleigh, NC (US); Scott Wentao Li, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 217 days.

(21) Appl. No.: 16/795,918

(22) Filed: Feb. 20, 2020

(65) Prior Publication Data

US 2021/0264019 A1 Aug. 26, 2021

(51) Int. Cl.
*G06F 21/46* (2013.01)
*G06F 21/62* (2013.01)

(52) U.S. Cl.
CPC .......... *G06F 21/46* (2013.01); *G06F 21/6209* (2013.01)

(58) Field of Classification Search
CPC ..... G06F 21/46; G06F 21/6209; H04L 9/0863
USPC .......................................................... 726/18
See application file for complete search history.

(56) References Cited

U.S. PATENT DOCUMENTS

| | | | | |
|---|---|---|---|---|
| 7,739,733 B2 * | 6/2010 | Szydlo | .................. | H04L 9/3218 726/17 |
| 8,261,087 B2 * | 9/2012 | Fort | ...................... | H04L 9/3226 713/184 |
| 8,881,266 B2 * | 11/2014 | Chow | ..................... | G06F 21/31 713/168 |
| 9,767,262 B1 * | 9/2017 | Canavor | ............... | H04L 9/3226 |
| 9,954,867 B1 * | 4/2018 | Johansson | ............... | G06F 21/31 |
| 10,068,086 B2 * | 9/2018 | Andreeva | ............... | G06F 21/46 |
| 10,389,707 B2 * | 8/2019 | Grunin | ................ | H04L 63/0838 |
| 11,133,934 B2 * | 9/2021 | Abadir | ................. | H04L 9/3234 |
| 11,271,926 B2 * | 3/2022 | Tzur-David | ............ | H04L 63/20 |
| 2009/0037989 A1 * | 2/2009 | Ruggiero | ................ | G06F 21/35 726/6 |
| 2009/0241201 A1 * | 9/2009 | Wootton | ................. | G06F 21/31 726/28 |

(Continued)

OTHER PUBLICATIONS

Yildirim, et al., "Encouraging users to improve password security and memorability" Apr. 2019, International Journal of Information Security, p. 748 (Year: 2019).*

(Continued)

*Primary Examiner* — Mahfuzur Rahman
*Assistant Examiner* — Alex D Carrasquillo
(74) *Attorney, Agent, or Firm* — Ference & Associates LLC

(57) ABSTRACT

One embodiment provides a method, including: receiving, in an application on an information handling device, a password reset request from a user; accessing, subsequent to the receiving, a data store comprising a list of answers that are responsive to a list of security questions; constructing, using the data store, a temporary password, wherein the temporary password consists of at least one answer selected from the list of answers; and providing, to the user, a prompt containing an indication of the temporary password, wherein the prompt comprises at least one security question, from the list of security questions, that corresponds to the at least one answer. Other aspects are described and claimed.

20 Claims, 3 Drawing Sheets

(56) References Cited

U.S. PATENT DOCUMENTS

2009/0320107 A1* 12/2009 Corella .................. G06F 21/31
726/6
2017/0033936 A1* 2/2017 Cidon .................. H04L 9/3239
2018/0288019 A1* 10/2018 Dinia .................... H04L 9/3239

OTHER PUBLICATIONS

Anonymous, "The method of generating dynamic password", 2019-IPCOM000260359D (Year: 2019).*

* cited by examiner

US 11,880,449 B2

TEMPORARY PASSWORD FOR PASSWORD RESET

BACKGROUND

Users frequently utilize their information handling devices ("devices"), for example smart phones, tablets, laptop and/or personal computers, and the like, to access information in applications. Many of these applications require the user to login to a user profile prior to granting the user access to any further information. Oftentimes, users may forget one or more aspects of their login information (e.g., their username, their password, a combination thereof, etc.). In these situations, they may be temporarily prevented from accessing any desired information in the application.

BRIEF SUMMARY

In summary, one aspect provides a method, comprising: receiving, in an application on an information handling device, a password reset request from a user; accessing, subsequent to the receiving, a data store comprising a list of answers that are responsive to a list of security questions; constructing, using the data store, a temporary password, wherein the temporary password consists of at least one answer selected from the list of answers; and providing, to the user, a prompt containing an indication of the temporary password, wherein the prompt comprises at least one security question, from the list of security questions, that corresponds to the at least one answer.

Another aspect provides an information handling device, comprising: at least one sensor; a processor; a memory device that stores instructions executable by the processor to: receive, in an application, a password reset request from a user; access, subsequent to the receiving, a data store comprising a list of answers that are responsive to a list of security questions; construct, using the data store, a temporary password, wherein the temporary password consists of at least one answer selected from the list of answers; and provide, to the user, a prompt containing an indication of the temporary password, wherein the prompt comprises at least one security question, from the list of security questions, that corresponds to the at least one answer.

A further aspect provides a product, comprising: a storage device that stores code, the code being executable by a processor and comprising: code that receives, in an application, a password reset request from a user; code that accesses, subsequent to the receiving, a data store comprising a list of answers that are responsive to a list of security questions; code that constructs, using the data store, a temporary password, wherein the temporary password consists of at least one answer selected from the list of answers; and code that provides, to the user, a prompt containing an indication of the temporary password, wherein the prompt comprises at least one security questions, from the list of security questions, that corresponds to the at least one answer.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
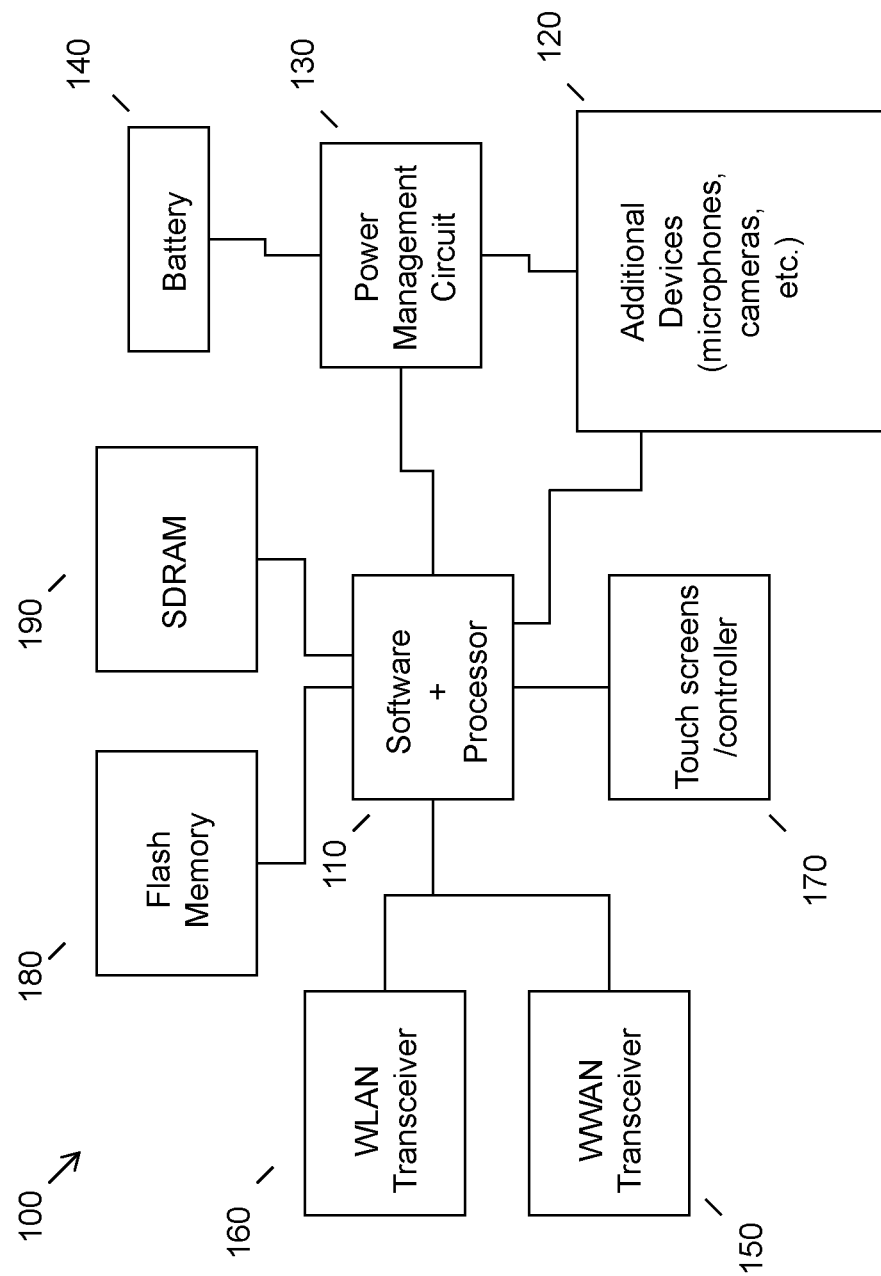
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional automated password reset techniques are problematic. For example, responsive to receiving a user request to reset a password, a conventional system may communicate the user's login information (e.g., their username, password, a temporary password via a reset link, etc.) to them using an unsecured communication channel (e.g., via an SMS text message, an email, etc.). It is not uncommon for these transmissions to be intercepted by a bad actor that may thereafter use the intercepted information to obtain unauthorized access to a user's account. In another example, another conventional system may prompt a user to answer one or more security questions to validate their identity instead of requiring a password. However, these interactive prompts may be spoofed and the answers to these security questions may be captured by bad actors posing as password reset websites.

Accordingly, an embodiment provides a method for issuing a more secure temporary password for a password reset process. In an embodiment, a password reset request may be received from a user in an application. An embodiment may then access a data store that contains a list of security questions and a corresponding list of user-provided answers that are responsive to the security questions. Then, an embodiment may utilize the lists of security questions and corresponding answers to construct a temporary password.

The temporary password may consist of at least one of the security answers arranged in some predetermined order. Thereafter, an embodiment may transmit a message or prompt to the user that contains an indication of the temporary password. For example, the transmitted prompt may identify that the temporary password is comprised of the answers to the one or more security questions. Such a method may improve the security of transmitted temporary passwords in password reset processes.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
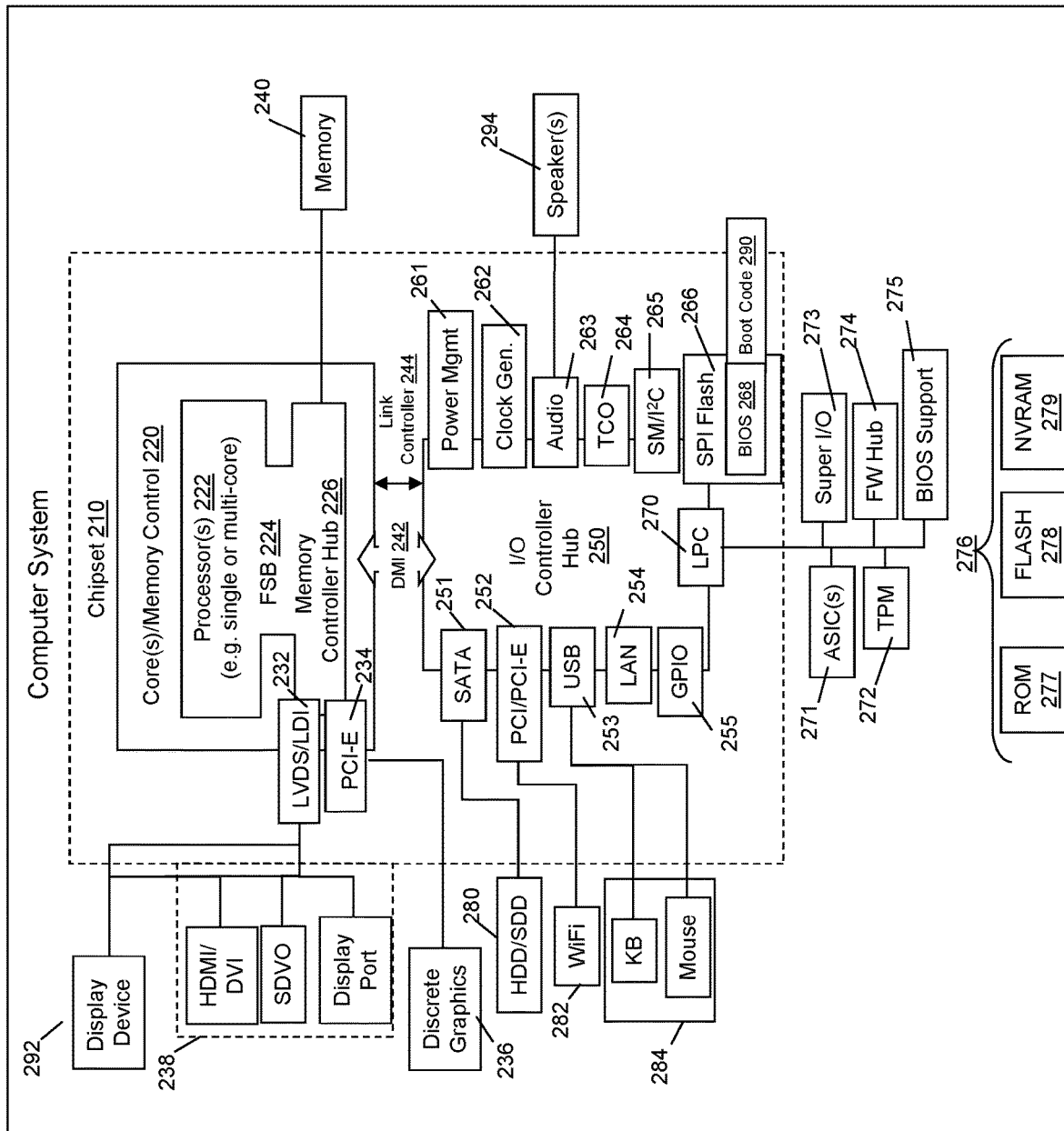
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving user inputs and providing corresponding outputs to those inputs. For example, the circuitry outlined in FIG. 1 may be implemented in a smart phone or tablet embodiment, whereas the circuitry outlined in FIG. 2 may be implemented in a laptop.

Figure 3:
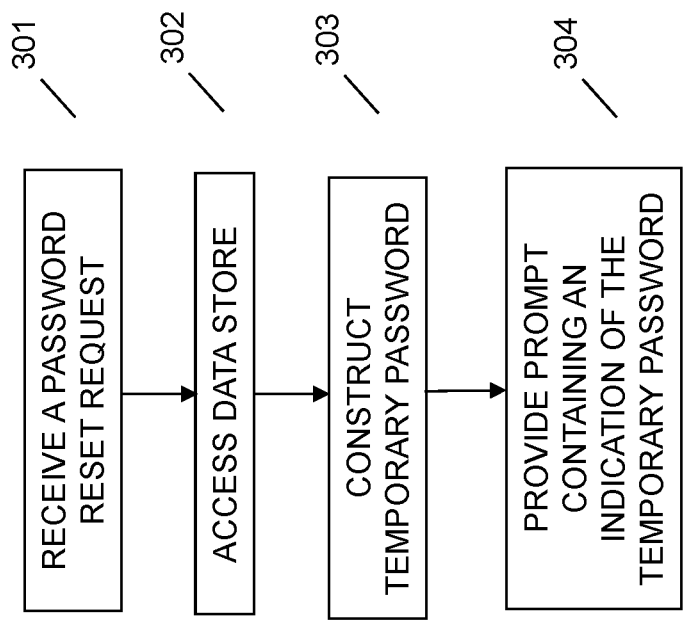
FIG. 3 illustrates an example method of providing a user with a temporary password.

Referring now to FIG. 3, an embodiment provides a method for providing a temporary password during a password reset process. At 301, an embodiment may receive a password reset request in an application. In an embodiment, the application may refer to virtually any application that contains some type of login page. More particularly, the application may comprise one or more input fields that require a user to at least enter a password but may also require a user to enter additional information such as a username. In an embodiment, the application may comprise a password reset option (e.g., embodied in a virtual button, etc.) and the password reset request may be a user selection on that option.

At 302, an embodiment may access a data store that contains a list of security questions and a corresponding list of user-provided answers that are responsive to the security questions. In an embodiment, an application may provide the user with a registration portion (e.g., when the user indicates a desire to register with the application or with a service provided by the application, etc.) during which they are asked one or more predetermined security questions. Non-limiting examples of possible security questions may include a birth year, a mother's maiden name, a first pet's name, a favorite color, a best friend's name, etc. The user may then enter responsive answers to the security questions that are thereafter saved in the data store. In an embodiment, the data store may be stored locally on the device or may be stored remotely on another accessible device or at another accessible storage location (e.g., cloud storage, etc.).

At 303, an embodiment may construct a temporary password using the information in the data store. In an embodiment, the temporary password may be a combination of one or more of the user-provided answers. In a situation where the temporary password is composed of two or more of the user-provided answers, these answers may be arranged in a predetermined order. As further described below, the predetermined order may be determined randomly and may also be dependent upon an ordering of at least two security questions presented to the user in a prompt. In an embodiment, the temporary password may consist of all alphabetic characters, all numerical characters, or may contain some combination of the foregoing, as further illustrated in examples below.

In an embodiment, the temporary password may be determined randomly. Stated differently, an embodiment may randomly determine: which of the user-provided answers will be present in the password, the ordering of the selected user-provided answers, the number of user-provided answers present in the password, any combination of the foregoing, etc. This randomization process may initiate each time that a password reset request is received. Additionally or alternatively, certain aspects of the temporary password formation may be dependent on various characteristics of the underlying application and/or the content a user is attempting to access. For example, access to a high priority application (e.g., a banking application, a credit card application, a work application, etc.) may demand a more complicated temporary password (e.g., a temporary password that is composed of a greater number of user-provided passwords, a temporary password that is case-sensitive, etc.).

At 304, an embodiment may provide a prompt to the user that contains an indication of the temporary password. In an embodiment, the prompt may be provided to the user as a message or notification within the application. Alternatively, the prompt may be transmitted to the user using a secondary communication channel (e.g., via SMS message, email, etc.). In an embodiment, the prompt may contain a selection of at least two security questions that directly correspond to the user-provided answers selected to be in the temporary password. The prompt may also contain an indication of how the answers to the security questions should be organized in order to correctly replicate the temporary password (e.g., whether the answers to the security questions should be written in order, whether a numerical answer should be comingled among the alphabetic answers, whether the temporary password is case-sensitive, etc.).

Non-limiting examples of sample prompts that correspond to the inventive concept are further described below.

In an example, a temporary password may be produced that consists of three user-provided answers to the security questions "what is your first pet's name?", "what is your favorite color?", and "what is your best friend's first name?". The answers to these questions may respectively be "Rover", "blue", and "Martin" to correspondingly produce the temporary password "RoverblueMartin". A password reset email may be transmitted to the user (e.g., via email, etc.) that informs the user that the temporary password is the combination of the user-provided answers to the three foregoing security questions written in order with respect to the appearance of the security questions. For example, the prompt in the password reset email may state "Your temporary password is the combination of your answers to the security questions 'what is your first pet's name?', 'what is your favorite color?', and 'what is your best friend's name' provided in order without spaces. This password is not case-sensitive".

In another example, a portion of the temporary password may correspond to a numerical user-provided answer. For instance, a temporary password may be produced that consists of five user-provided answers to the security questions "what is your first pet's name?", "what is your favorite color?", "what is your best friend's first name?", "what is your mother's maiden name?", and "what year did you graduate high school?". The answers to these questions may respectively be "Rover", "blue", "Martin", "Davis", and "1990". Accordingly, a temporary password that corresponds to these security questions, written in order, may be "RoverblueMartinDavis1990". Alternatively, an embodiment may instruct the user to comingle digits of the numerical answer among the other answers in some predefined way. For example, the temporary password derived by an embodiment may be "Rover1blue9Martin9Davis0". In this situation, the prompt may inform the user that a digit of their graduation year should be placed after each of the other word-based answers.

In an embodiment, after receiving the temporary password from the user in an input field of the application, an embodiment may determine whether the input password corresponds to the system-generated temporary password. Responsive to determining that the input password is the same as the system-generated temporary password, an embodiment may either authorize the user access to the application or may direct the user to another page where they may establish a permanent password. Conversely, responsive to determining that a discrepancy exists between the input password and the system-generated temporary password, an embodiment may deny the user access to the application and/or may take one or more additional actions. For example, an embodiment may generate and transmit a new temporary password to the user. As another example, an embodiment may identify a user's mistake in inputting the temporary password (e.g., that a user provided the correct answers but placed them in the incorrect order, that a user provided the correct answers but did not mind the case-sensitive requirement, etc.) and provide the user a hint that may allow them to enter the temporary password properly.

The various embodiments described herein thus represent a technical improvement to conventional methods of providing a user with a temporary password during a password reset process. Using the techniques described herein, an embodiment may receive a password reset request from a user. In response to this request, an embodiment may access a data store that contains a list of user-provided answers that are responsive to a corresponding list of security questions. An embodiment may then construct a temporary password with reference to this list. The temporary password may consist of at least one of the user-provided answers. Thereafter, an embodiment may provide the user with a prompt that contains an indication of what the temporary password is. More particularly, the prompt may comprise at least one security question that directly corresponds to the at least one answer utilized in the temporary password. Such a method provides for a unique and novel way for developing temporary passwords. Additionally, such a method improves the security of temporary password transmission. More particularly, even if a bad actor intercepts the prompt that provides an indication of the temporary password, they still would be unable to access a user profile in a particular application because they would not know the answers to the security questions that constitute the temporary password.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, in an application on an information handling device, a password reset request from a user;
   accessing, subsequent to the receiving, a data store comprising a list of user-provided answers that are responsive to a list of security questions;
   constructing, using the data store, a temporary password, wherein the temporary password consists of at least one answer selected from the list of answers;
   providing, to the user, a prompt containing an indication of the temporary password without the temporary password in the prompt, wherein the indication comprises at least one security question, from the list of security questions, that corresponds to the at least one answer, wherein an order of the list of security questions informs the user of a proper order to assemble the temporary password based upon the list of user-provided answers, wherein a plurality of digits from an at least one numerical answer to the list of security questions are comingled between the at least one answer based upon the proper order to assemble the temporary password, wherein an interception by an another user maintains transmission security of the temporary password, wherein the assembly of the temporary password randomizes the ordering of the user-provided answers, wherein a number of the user-provided answers for the temporary password is based upon a priority of the application; and
   authorizing the user access to the application responsive to identifying a match between user provided answers to the prompt and the constructed temporary password.

2. The method of claim 1, wherein the at least one answer comprises a numerical answer and a textual answer.

3. The method of claim 2, wherein at least one answers comprises a numerical answer and wherein portions of the numerical answer are comingled among the textual answer in a predefined way.

4. The method of claim 2, wherein the textual answer is arranged in a predetermined order and wherein the predetermined order is derived from an ordering of the at least one security question in the prompt.

5. The method of claim 4, wherein the ordering is randomized each time the password reset request is received.

6. The method of claim 1, wherein the providing comprises transmitting the prompt to the user using a secondary communication channel.

7. The method of claim 6, wherein the secondary communication channel is selected from the group consisting of an SMS message, an email, and a notification.

8. The method of claim 1, wherein the providing comprises providing the prompt in the application.

9. The method of claim 1, wherein the list of answers is received from the user during a password registration process.

10. The method of claim 1, further comprising:
receiving, in an input field of the application, the temporary password; and
directing, responsive to confirming the temporary password, the user to a password reset page.

11. An information handling device, comprising:
at least one sensor;
a processor;
a memory device that stores instructions executable by the processor to:
receive, in an application, a password reset request from a user;
access, subsequent to the receiving, a data store comprising a list of user-provided answers that are responsive to a list of security questions;
construct, using the data store, a temporary password, wherein the temporary password consists of at least one answer selected from the list of answers;
provide, to the user, a prompt containing an indication of the temporary password without the temporary password in the prompt, wherein the indication comprises at least one security question, from the list of security questions, that corresponds to the at least one answer, wherein an order of the list of security questions informs the user of a proper order to assemble the temporary password based upon the list of user-provided answers, wherein a plurality of digits from an at least one numerical answer to the list of security questions are comingled between the at least one answer based upon the proper order to assemble the temporary password, wherein an interception by an another user maintains transmission security of the temporary password, wherein the assembly of the temporary password randomizes the ordering of the user-provided answers, wherein a number of the user-provided answers for the temporary password is based upon a priority of the application; and
authorize the user access to the application responsive to identifying a match between user provided answers to the prompt and the constructed temporary password.

12. The information handling device of claim 11, wherein the at least one answer comprises.

13. The information handling device of claim 12, wherein at least one answers comprises a numerical answer and wherein portions of the numerical answer are comingled among the textual answer in a predefined way.

14. The information handling device of claim 12, wherein the textual answer is arranged in a predetermined order and wherein the predetermined order is derived from an ordering of the at least one security question in the prompt.

15. The information handling device of claim 14, wherein the ordering is randomized each time the password reset request is received.

16. The information handling device of claim 11, wherein the instructions executable by the processor to provide comprise instructions executable by the processor to transmit the prompt to the user using a secondary communication channel.

17. The information handling device of claim 11, wherein the instructions executable by the processor to provide comprise instructions executable by the processor to provide the prompt in the application.

18. The information handling device of claim 11, wherein the list of answers is received from the user during a password registration process.

19. The information handling device of claim 11, wherein the instructions are further executable by the processor to:
receive, in an input field of the application, the temporary password; and
direct, responsive to confirming the temporary password, the user to a password reset page.

20. A product, comprising:
a storage device that stores code, the code being executable by a processor and comprising:
code that receives, in an application, a password reset request from a user;
code that accesses, subsequent to the receiving, a data store comprising a list of user-provided answers that are responsive to a list of security questions;
code that constructs, using the data store, a temporary password, wherein the temporary password consists of at least one answer selected from the list of answers;
code that provides, to the user, a prompt containing an indication of the temporary password without the temporary password in the prompt, wherein the indication comprises at least one security questions, from the list of security questions, that corresponds to the at least one answer, wherein an order of the list of security questions informs the user of a proper order to assemble the temporary password based upon the list of user-provided answers, wherein a plurality of digits from an at least one numerical answer to the list of security questions are comingled between the at least one answer based upon the proper order to assemble the temporary password, wherein an interception by an another user maintains transmission security of the temporary password, wherein the assembly of the temporary password randomizes the ordering of the user-provided answers, wherein a number of the user-provided answers for the temporary password is based upon a priority of the application; and
code that authorizes the user access to the application responsive to identifying a match between user provided answers to the prompt and the constructed temporary password.

* * * * *